United States Patent Office 3,514,973
Patented June 2, 1970

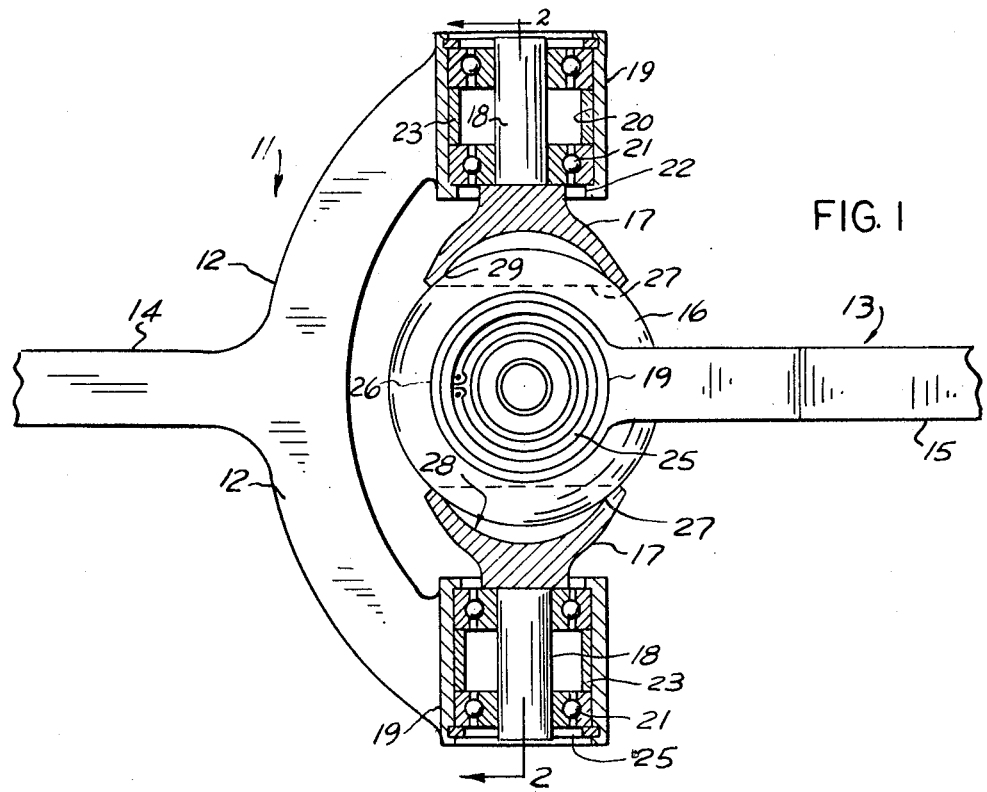
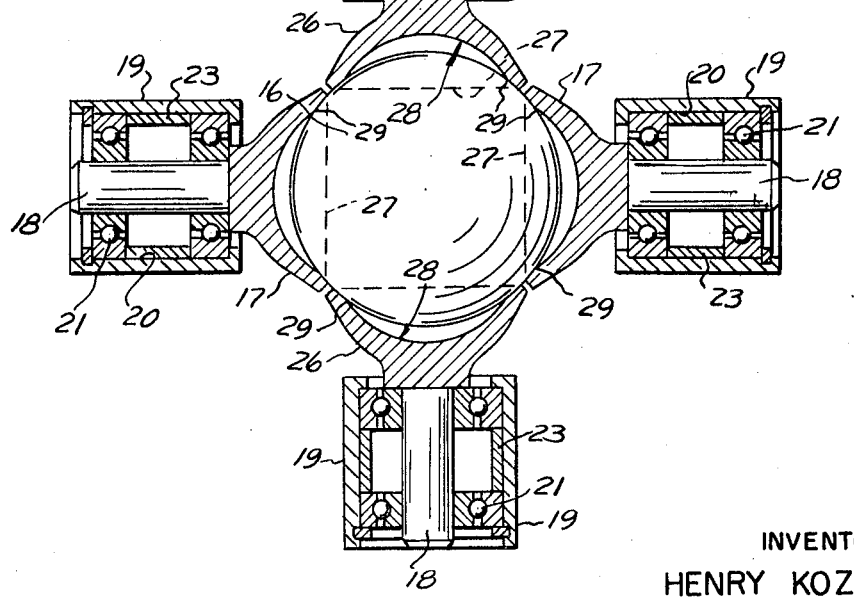

3,514,973
UNIVERSAL JOINT
Henry Kozerski, 3350 Greenfield,
Royal Oak, Mich. 48072
Filed Jan. 27, 1969, Ser. No. 794,198
Int. Cl. F16d 3/30
U.S. Cl. 64—17                     4 Claims

ABSTRACT OF THE DISCLOSURE

A universal joint with constant velocity including drive and driven forks, each fork mounting a pair of spaced opposed sockets, and a ball interposed between and compressively engaged by said sockets, with bearings mounting said sockets and serving as end thrust means to bias said sockets against said ball.

BRIEF DESCRIPTION OF THE INVENTION

The present invention is directed to universal joint providing constant velocity and wherein the pair of angularly related drive and driven forks each include spaced oppositely and inwardly directed sockets and with a unit ball interposed between and compressively engaged by the sockets of the respective forks.

It is the object of the present invention to utilize said ball in conjunction with the said sockets and suitable bearing means removably retained within the sockets for journalling the sockets and for biasing the same into operative nesting engagement with said ball.

These and other objects will be seen from the following specification and claims in conjunction with the appended drawing in which:

FIG. 1 is a plan view of the present universal joint with the fork ends of one fork shown in cross-section.

FIG. 2 is a fragmentary section taken in the direction of arrows 2—2 of FIG. 1.

Referring to the drawing, the present universal joint 11 includes drive fork 12 and driven fork 13, said forks including drive shaft 14 and driven shaft 15.

Respective drive and driven forks are universally interconnected by a unit ball 16 which may be made of steel or made of plastic material interposed between interconnecting and compressively engaged by diametrically opposed pairs of sockets shown in FIGS. 1 and 2.

The drive fork mounts at its free ends a pair of spaced diametrically opposed inwardly directed sockets 17 which are journalled and retained within the ends of drive fork 12. Each socket includes an elongated outwardly extending shank or rod 18 which is journalled through the opposed fork ends 19.

Said fork ends have opposed aligned bores 20 within which are nested and retained the bearing means shown.

In the illustrated form of the present invention said bearing means rests against the annular internal flange of the fork ends which define the retaining shoulder 22. A pair of ball bearings 21 with spaced 23 interposed are nested within the respective bores 20, bear against the shoulder stop 22 and are secured in position by the removable snap ring 25.

The driven fork 13 is provided with a similar construction which includes the diametrically opposed spaced inwardly directed driven sockets 26 which are similarly mounted within the forked ends in a construction exactly the same as above described with respective FIG. 1 and which construction is not repeated.

It is therefore seen that the respective sockets 17 of which there are a pair and a second set of sockets 26 of which there are another pair are arranged around the circumference of the ball 16 throughout 360° substantially.

The sockets 17 and 26 may be of a curvature or radius to correspond to that of the ball 16 for operative socket engagement therewith or alternately as shown in the illustration may include an arcuate recess 28 defined by a radius which is less than the radius of the ball 16. By such construction as seen the sockets 17 and 26 engage the ball 16 throughout lines of contact which extend throughout 360° as shown at 27, FIG. 1.

The internal shoulders 22 at the inner ends of the bores of the fork ends define a stop for anchoring the bearing means which are shown as a pair of spaced ball bearings 21 of which could be replaced by roller bearings if desired. In any event, the bearing means which include the bearings 21 and the spacer 23 are nested and retained within the fork ends by means of the snap rings 25 completing the assembly.

In the construction shown in FIG. 1, the inner set of ball bearings 21 retainingly engage against the outer ends of the sockets 17 as well as the sockets 26 for retaining the said sockets in operative drive or driven engagement or surface engagement with the ball 16.

For assembly or disassembly of the respective forks, the snap ring is disengaged to thus permit axial outward adjustment of at least one of the sets of sockets 17 or 26 and is reassembled to the position shown in FIGS. 1 and 2.

It is noted from the present construction that the ball connection 16 provides a means by which drive and driven forks may be operated in general alignment such as shown in FIG. 1 or in any desired angular relation for the transmission of rotary motion from one fork to the other.

Regardless of the angular relationship between the drive and driven forks, it is seen that all the respective sockets 17 and 26 occupy a single plane with respect to the ball 16.

A bearing arrangement, not only mounting the sockets 17 and 26 for rotary adjustment also serve to bias the sockets into operative engaging relation with the ball during the operation of the universal joint. At the same time the bearing arrangement is such that the sockets may be telescoped outwardly to the extent needed for assembly with respect to the ball 16 after which the bearing assembly is returned to the position shown in FIGS. 1 and 2 retained by the snap rings 25 or equivalent construction.

The present construction permits easy manufacture of the present universal joint which has a limited number of similar parts.

During function and operation of the universal joint the four caps or sockets 17 and 26 arranged in diametrically opposed right angularly related pairs are at all times in constant contact with the ball 16.

One form of bearing means is illustrated in the drawings. It is contemplated however, that other types of bearings may be employed which serve the function of rotatively mounting the respective sockets and at the same time permitting limited telescoping outward adjustment for assembly.

The bearings are provided to reduce wear and friction and to counteract torque forces especially at heavy loads and wherein an angular relationship may be established between the drive and driven forks.

As shown in FIG. 1, the internal radius 28 of each socket terminates in an outer annular ball contacting portion 29 having a radius the same as ball 16.

The present universal joint contains only one centrally located perfectly formed ball or sphere 16, without any extensions or cavities on its surface. Said ball does not participate directly in the transferring of the rotary force from the drive to the driven shaft.

Having described my invention reference should now be had to the following claims.

I claim:
1. A universal joint with constant velocity comprising:
   a drive and driven fork including drive and driven shafts respectively;
   a pair of spaced diametrically opposed inwardly directed sockets journalled and retained within the ends of each fork;
   each fork, its shaft and socket lying in a unit plane;
   and a ball interposed between and compressedly engaged by said pairs of sockets flexibly interconnecting said forks;
   the general points of engagement of said sockets and ball lying in a unit plane extending around said ball and engaging the same throughout substantially 360°;
   each fork having a pair of spaced apart forked ends with aligned bores;
   an outwardly extending shank on each socket axially extending through said bores respectively;
   and bearing means nested and retained in said forked ends journalling said shanks and biasing said sockets against said ball,
   there being only one such ball which is a centrally located perfectly formed sphere without any extensions or cavities on its surface, said ball not participating directly in the transferring of rotary force from the drive to the driven shaft.

2. In the universal joint of claim 1, the internal radii of said sockets being less than the radius of said ball, whereby each socket has a line of contact with said ball extending throughout 360° of the socket.

3. In the universal joint of claim 1, the bore of said forked ends at its inner end having an internal flange defining a stop shoulder;
   said bearing means engaging said shoulder;
   and a snap ring nested within an outer portion of said bore retaining said bearing means within said forked ends;
   said sockets being retainingly engaged by said bearing means against radial outward movement.

4. In the universal joint of claim 1, the internal radii of said sockets being less than the radius of said ball, whereby each socket has a line of contact with said ball extending throughout 360° of the socket;
   the internal radius of each socket terminating in an outer annular portion having a radius the same as said ball corresponding to said line of contact.

References Cited

UNITED STATES PATENTS

| 1,264,976 | 5/1918 | Rhodes | 64—17 |
| 3,197,535 | 7/1965 | Morin | 64—17 XR |
| 3,296,830 | 1/1967 | Runkle | 64—17 |
| 3,310,959 | 3/1967 | Sheppard | 64—17 |

JAMES A. WONG, Primary Examiner

U.S. Cl. X.R.

64—21